Sept. 17, 1957  G. MEISTER ET AL  2,806,970
ELECTRON EMISSION COATINGS AND METHOD OF PREPARING AIR STABILIZED BARIUM OXIDE
Filed March 1, 1954
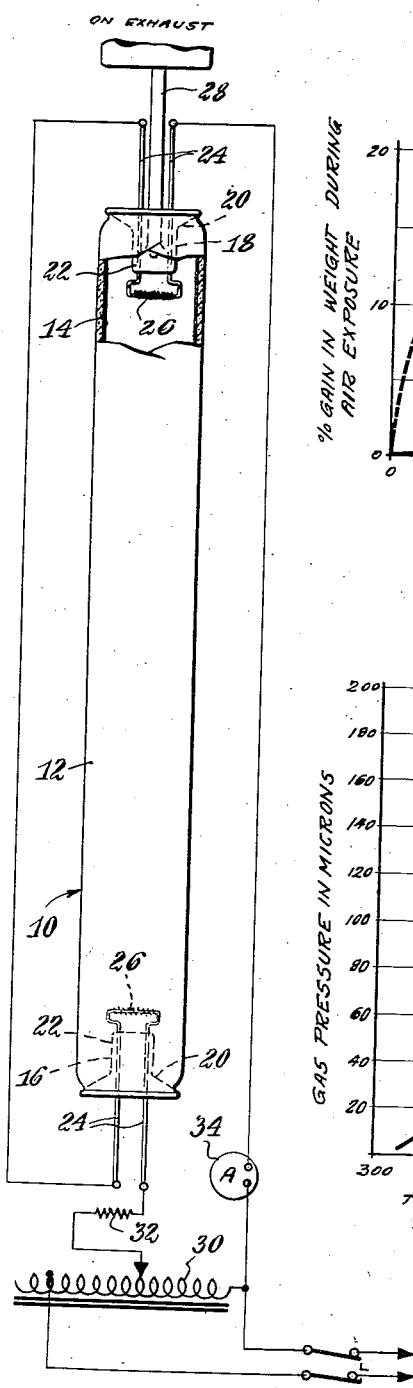
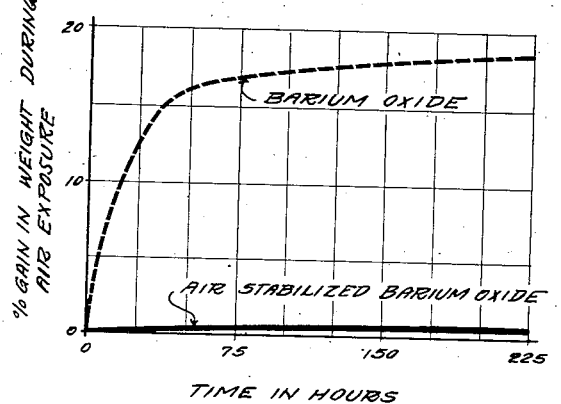
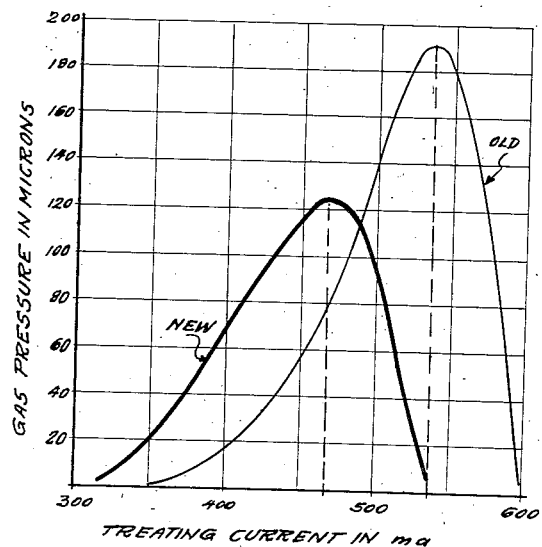
INVENTORS
GEORGE MEISTER and
T. H. HEINE
BY United States Patent Office 2,806,970
Patented Sept. 17, 1957

2,806,970

ELECTRON EMISSION COATINGS AND METHOD OF PREPARING AIR STABILIZED BARIUM OXIDE

George Meister, Newark, and Thomas H. Heine, Cedar Grove, N. J., assignors to Westinghouse Electric Corporation, East Pittsburgh, Pa., a corporation of Pennsylvania Application March 1, 1954, Serial No. 413,082

7 Claims. (Cl. 313—109)

This invention relates to electron emission coatings and, more particularly, to electron emission coatings for fluorescent lamp electrodes, and to a method of preparing air stabilized barium oxide.

Fluorescent lamp electrodes have usually taken the form of a coiled-coil filament carrying a single, double or triple alkaline-earth oxide on the turns of the smaller coil. In preparing these alkaline-earth oxide coatings of the prior art, either an alkaline-earth carbonate or a mixture of alkaline-earth carbonates are suspended in a lacquer of nitrocellulose and a solvent to form an emission mixture. The mounted coiled-coil filament is dipped into the emission mixture and a mount carrying a filament is sealed into either end of the fluorescent lamp envelope. The sealed envelope is then put on exhaust and the coated electrodes are treated by connecting them across a potential and passing a current through the coiled-coil tungsten wires of the electrodes. The treating current is gradually increased and the electrodes are thus gradually heated with an ever increasing evolution of carbon dioxide gas as the alkaline-earth carbonates are converted to alkaline-earth oxides. Normally the gas evolution reaches a peak at a heating current of about 535 milliamperes in the case of a 40 w. T12 lamp, and after this the evolution of carbon dioxide decreases sharply as most of the carbonates are converted to the oxides. A representative treatment period for these prior art practices is approximately 60 seconds and a representative maximum filament temperature during treatment is about 1310° C.

The liberation of carbon dioxide during electrode treatment has long been an objectionable feature, since the liberated gas spoils the previously attained vaccum necessitating continued pumping, and a relatively long period of treatment because of the prolonged evacuation required. Also, any residual carbon dioxide which is not pumped out will cause the positive column to wiggle during lamp operation and eventually result in light absorbing deposits at the ends of the lamp normally known as end bands.

The immediately obvious solution to the elimination of the involved electrode treatment of the prior art is to initially coat the coiled-coil filament with alkaline-earth oxides rather than the alkaline-earth carbonates. Unfortunately, the alkaline-earth oxides, and particularly barium oxide, are very unstable in air and during the necessary handling and electrode coating process before the mounts are sealed into envelope, the alkaline-earth oxides, and particularly the barium oxide, would be pretty well converted to a mixture of barium carbonate and barium hydroxide and nothing would be gained.

The alkaline-earth oxides other than barium oxide are also offenders in this respect, but since barium oxide is normally the sole or largest constituent of the alkaline-earth oxide emission coating, any means by which barium oxide can be made stable in air is a step forward in simplifying the electrode treatment by decreasing the gas evolution during electrode treatment.

The temperature at which the carbonates begin to break down to the oxides in air is 1130° C. for barium carbonate, 1000° C. for strontium carbonate and 720° for calcium carbonate. In order to break down the triple carbonates of the prior art it is necessary to heat the coated, untreated emission mixture in a vacuum to a maximum temperature of about 1310° C. At this temperature there exists a tendency for chemical reaction between the tungsten coiled-coil filament and the coated emission mixture to form tungstates, which are relatively poor electron emitters. This tendency to form tungstates is much greater at higher temperatures and any reduction in the maximum temperature which is required for emission mixture treatment will improve the performance of the emission coating by reducing the percentage of tungstates in the treated coating.

It is the general object of the invention to avoid and overcome the foregoing and other difficulties of and objections to prior art practices by the provision of a barium oxide which is stabilized in air.

It is a further object of the invention to provide an electron emission coating wherein the barium component will evolve very little gas during treatment, thus simplifying treatment.

It is another object to provide an electron emission coating for a fluorescent lamp which coating will reduce the tendency of the lamp to wiggle during operation.

It is still another object to provide an electron emissive coating for a fluorescent lamp which coating will increase the life of the lamp.

It is yet another object to provide an electron emission coating for a fluorescent lamp which coating will reduce the tendency of the lamp to develop end bands.

It is still a further object of the invention to provide an electron emission coating which can be treated at lower temperatures which minimizes the formation of tungstates thereby improving lamp performance.

It is still another object to provide a method of preparing barium oxide which is relatively stable in air.

The aforesaid objects of the invention, and other objects which become apparent as the description proceeds, are achieved by stabilizing barium oxide with respect to air by mixing powdered zirconium or a zirconium compound which forms zirconia on heating in air and a barum compound which forms barium oxide on heating in air and heating the mixture to form air stabilized barium oxide, which is then incorporated in an electron emission coating as in the prior art.

For a better understanding of the invention, reference should be had to the accompanying drawing wherein:

Fig. 1 is an elevational view, partly in section, of a fluorescent lamp during emission mixture treatment, which illustrates the lamp and the apparatus used for treatment.

Fig. 2 is a graph of percent gain in weight during air exposure vs. time in hours, comparing the relative gain in weight of the usual barium oxide and the air stabilized barium oxide of this invention.

Fig. 3 is a graph showing gas pressure in microns vs. treating current in milliamps, which illustrates the gas evolution for an emission mixture containing the barium carbonate of the prior art and an equivalent emission mixture containing the air stabilized barium oxide of this invention.

Although the principles of the invention are broadly applicable to any electron emission coating, the invention is usually employed with an electron emission coating for a fluorescent lamp electrode, and hence has been so illustrated and will be so described.

With specific reference to the form of the invention illustrated in the drawings, the fluorescent lamp 10 shown in Fig. 1 represents a typical 40 w. T12 lamp comprising a tubular vitreous envelope 12 having a fluorescent material interiorly coated thereon, an example being zinc silicate, activated by 1.5% manganese. Mounts 16 and 18 are sealed in either end of the envelope and each mount comprises a vitreous stem 20 having a press 22 with copper-nickel (dumet) lead-in conductors 24 sealed through the press and supporting coiled-coil tungsten filaments 26 between their inwardly extending extremities. The coiled-coil tungsten filaments carry on their inner or minor coils the improved electron emission coating of this invention. In addition, the mount 18 is also provided with an exhaust tube 28, as is customary. The fabricated lamp is also provided with a charge of mercury and an inert, ionizable starting gas, such as argon at 3–4 mm. pressure, as is customary.

The electron emission coating which is coated onto the cathodes 26 may consist solely of air stabilized barium oxide, but it is preferable to use a triple alkaline-earth oxide consisting of about 60% by weight air stabilized barium oxide, 30% strontium oxide, and 10% calcium oxide. The emission coating may also consist of air stabilized barium oixde and strontium oxide or calcium oxide, and there is listed in the following table a specific example as well as allowable ranges for each of the aforementioned emission coatings.

| Emission material—Components | Treated emission coating composition | |
|---|---|---|
| | Specific example | Allowable ranges |
| I. BaO–BaZrO₃ | 90% BaO–10%BaZrO₃ | 80–99% BaO, 20–1% BaZrO₃. |
| II. BaO–BaZrO₃, SrO, CaO | 60% (90% BaO–10%BaZrO₃), 30% SrO, 10% CaO | 55–65% (80–99%BaO–20–1%BaZrO₃), 25–35% SrO, 5–15% CaO. |
| III. BaO–BaZrO₃, SrO | 70% (90%BaO–10%BaZrO₃), 30% SrO | 60–80% (80–99%BaO–20–1%BaZrO₃), 40–20% SrO. |
| IV. BaO–BaZrO₃, Ca | 80% (90%BaO–10%BaZrO₃O), 20% CaO | 75–85% (80–99%BaO–20–1%BaZrO₃), 25–15% CaO. |

In preparing the air stabilized barium oxide of this invention, there is first admixed by ball-milling or other conventional mixing techniques a barium compound which will form barium oxide on heating in air and powdered zirconium metal or a zirconium compound which will form zirconia on heating in air, the molecular ratios of barium to zirconium in their respective compounds preferably being 1 to 0.058. As a barium compound we may use barium carbonate or preferably barium hydroxide; other suitable barium compounds may also be used. As a zirconium compound we may use powdered zirconium metal, zirconium oxalate, zirconium nitrate, or preferably zirconium dioxide; other suitable zirconium compounds may also be used. As a specific example, one mole of barium hydroxide and 0.058 mole of zirconia are admixed and placed in a crucible for heating in an electric furnace in an air atmosphere for from 1 to 2 hours at a forming temperature of from 1200° C. to 1500° C. While 1500° C. is the highest temperature which has been used as a forming temperature, a higher forming temperature could be used if desired. If the 1200° C. forming temperature is used, this temperature should be maintained for about two hours, and if the 1500° C. forming temperature is used, this temperature should be maintained for about one hour. The minimum forming temperature is 1200° C. and the mix should be maintained at whatever forming temperature is used until substantially all of the zirconium metal or zirconium compound is converted to zirconate. After the mix has been heated as described, it may be allowed to slowly cool in air.

Heating the aforementioned specific amounts of barium hydroxide and zirconia will produce the preferred emission coating composition, i. e. 90% BaO—10% BaZrO₃, but the molecular ratios of barium to zirconium in their respective unheated compounds may be varied from 1/0.0036 to 1/0.121. The first unformed composition range limitation, i. e. 1/0.0036, will produce on formation an air stabilized barium oxide composition which is approximately 99% BaO—1%BaZrO₃, and the latter unformed composition range limitation, i. e., 1/0.121, will produce on formation an air stabilized barium oxide emission coating composition of 80% BaO—20% BaZrO₃.

Just what changes take place in heating the said zirconium and barium compounds in air to form the air stabilized barium oxide cannot be definitely established. However, X-ray diffraction data indicates the presence of barium zirconate, but neither zirconia nor barium carbonate. Even after a prolonged air exposure of the air stabilized barium oxide, the X-ray diffraction patterns do not indicate the presence of barium carbonate or barium hydroxide and one sample which had been exposed to air for six months failed to show the presence of barium carbonate or barium hydroxide. Since barium zirconate is not present in amounts exceeding 20% by weight of the total air stabilized barium oxide, it is safe to assume that the barium zirconate surrounds each particle of barium oxide thus encasing it in a protective coating. Were this not the case, some of the barium oxide would be reconverted on air exposure to barium carbonate or barium hydroxide, which would certainly indicate its presence in the X-ray diffraction tests.

To further illustrate the air stability of the air stabilized barium oxide of this invention, tests were conducted whereby the preferred composition of air stabilized barium oxide and ordinary barium oxide were exposed to air. This data is graphically represented in Fig. 2, and, as illustrated, the ordinary barium oxide after 50 hours of air exposure gains approximately 16.5% in weight indicating that about 58% of the barium oxide is recovered to barium carbonate or barium hydroxide. In contrast, after 50 hours of exposure of the air stabilized barium oxide to air, there is only a 0.22% gain in weight. Even this slight gain in weight, however, is attributed to an absorption of moisture from the air rather than a reconversion to barium carbonate or barium hydroxide, and this is verified by the failure of the X-ray diffraction tests to indicate the presence of any barium carbonate or barium hydroxide.

In the following table there are given four examples of untreated coating mixture, according to this invention, which may be used in preparing an electron emission coating.

*Example 1*

1,800 grams of 90% BaO—10% ZrO₃

*Example 2 (preferred example)*

894 grams of 90% BaO—10% ZrO₃
639 grams of SrCO₃
267 grams of CaCO₃
———
1,800

*Example 3*

1,118 grams of 90% BaO—10% ZrO₃
682 grams of SrCO₃
———
1,800

*Example 4*

1,235 grams 90% BaO—10% ZrO₃
565 grams CaCO₃
———
1,800

In order to apply the coating mixture to the coiled-coil filaments, an emission mixture of the oxide-carbonate of the heretofore given preferred example is prepared and may consist of the following:

1800 grams air stabilized barium oxide, strontium and calcium carbonates in the proportions as given in Example 2. It should be noted that Examples 1, 3 and 4 may be substituted for Example 2, if desired.

1000 cc. of a solution of nitrocellulose in "Cellusolve Acetate," having 1.6 to 1.8 percent by weight of solids and a viscosity of 50 to 55 seconds at 25° C. as measured in a number 7 Parlin cup. Cellusolve Acetate is a trademark of Union Carbide and Carbon Corporation and has the formula $CH_3COOCH_2OC_2H_5$.

Cellusolve Acetate added as necessary to produce a viscosity of 42 to 44 seconds at 25° C. as measured with a number 7 Parlin cup.

The foregoing components are milled to form a suspension of coating mixture which is known in the art as an emission mixture.

This emission mixture is then applied to the coiled-coil tungsten filament by dipping and then drying the coated electrode, as is described in co-pending application of Albert W. Wainio, Serial No. 399,657, filed December 22, 1953, titled "Electrode, Electrode Coating Apparatus and Method," and owned by the present assignee. A representative amount of coated emission material is 4.0 mg. per electrode for a 40 w. T12 lamp.

After filament coating, the mounts are sealed into the ends of the envelope as illustrated in Fig. 1 and the mounts are connected in series with a variable potential, for treating. Such treating apparatus is well-known and may consist of a source of A. C. potential, a variable output autotransformer 30, current limiting resistor 32 and a meter 34 in series with the electrodes being treated.

In cathode treating, the envelope 14 is first exhausted and treating circuit energized, the initial treating current being about 300 milliamps. This treating current is gradually increased over a period of about 45–50 seconds up to a maximum treating current of approximately 535 milliamps.

There is illustrated in Fig. 3 the carbon dioxide gas pressures encountered during treatment of the emission material of the prior art (shown in light lines) corresponding to the preferred example of this invention where it is also necessary to convert the barium carbonate to barium oxide, as well as the other alkaline-earth carbonates. Also shown are the carbon dioxide gas pressures encountered during treatment of the preferred example of the emission coating embodying the air stabilized barium oxide of this invention (shown in heavy lines). As illustrated, the maximum gas pressure for the example as given utilizing the BaO—$BaZrO_3$ of this invention will occur at a treating current of approximately 465 milliamps which represents a coil temperature of approximately 1070° C. The maximum treating current required is approximately 535 milliamps which represents a coil temperature of about 1190° C., which is the temperature at which maximum gas evolution occurred in treating the emission coating of the prior art. In contrast, the maximum treating current required to treat a corresponding emission material utilizing barium carbonate is 600 milliamps which represents a coil temperature of about 1310° C.

After treatment the lamp is given a final exhaust, mercury and an inert, ionizable starting gas, such as argon at 4 mm. pressure, are added, as is customary, and the lamp is tipped off.

Lamps utilizing the preferred example of the emission coating, as heretofore specified, namely 60% air stabilized barium oxide, 30% strontium oxide and 10% calcium oxide show improved performance over control lamps. The control lamps were provided with an equivalent emission mixture of the prior art, namely, 60% barium oxide, 30% strontium oxide and 10% calcium oxide. The lamps incorporating the improved emission mixture of this invention had an average life of 6% longer than the control lamps. In addition the lamps incorporating the improved emission mixture of this invention had no tendency toward wiggling and no tendency toward end-banding. Lamps utilizing other embodiments of the emission coating of this invention show a similar improvement over control lamps provided with equivalent emission coatings.

It will be recognized that the objects of the invention have been achieved by providing an air stabilized barium oxide which may be incorporated with other alkaline earth oxides as an emission mixture for a fluorescent lamp to form an improved electron emission coating. Lamps incorporating this improved coating will have an improved life, less tendency to wiggle and end-band and may be more easily treated. In addition a method of making air stabilized barium oxide has been provided.

In the foregoing description, reference has been made to a coiled-coil electrode. It should be readily apparent that a single coil or triple-coiled electrode can be used equally well, if desired.

While in accordance with the patent statutes, one best known embodiment of the invention has been illustrated and described in detail, it is to be particularly understood that the invention is not limited thereto or thereby.

We claim:

1. The method of preparing an air stabilized barium oxide comprising, mixing a barium compound which will form barium oxide on heating in air and a zirconium compound which will form zirconia on heating in air, the molecular ratios of barium in said barium compound to zirconium in said zirconium compound being from 1/0.0036 to 1/0.121, heating said mixed barium compound and said zirconium compound to a forming temperature of at least 1200° C., and maintaining said heated mixed compounds in an air atmosphere at said forming temperature until substantially all zirconium compound is converted to barium zirconate.

2. The method of preparing an air stabilized barium oxide comprising, mixing a barium compound which will form barium oxide on heating in air and a zirconium compound whch will form zirconia on heating in air, the molecular ratios of barium in said barium compound to zirconium in said zirconium compound being 1/0.058, heating said mixed barium compound and said zirconium compound to a forming temperature of at least 1200° C. and maintaining said heated mixed compounds in an air atmosphere at said forming temperature until substantially all zirconium compound is converted to barium zirconate.

3. The method of preparing air stabilized barium oxide comprising, mixing barium hydroxide and zirconium dioxide, the molar ratios of barium and zirconium being from 1/0.0036 to 1/0.121, heating said mixed barium hydroxide and said zirconium dioxide to a forming temperature of at least 1200° C., and maintaining said heated mixed compounds in an air atmosphere at said forming temperature until substantially all zirconia is converted to barium zirconate.

4. The method of preparing an air stabilized barium oxide comprising, mixing a barium compound which will form barium oxide on heating in air and a material selected from the group consisting of powdered zirconium metal and a zirconium compound which will form zirconia on heating in air, the molecular ratios of barium in said barium compound to zirconium being from 1/0.0036 to 1/0.121, heating said mixture to a forming temperature of at least 1200° C., and maintaining said heated mixture in an air atmosphere at said forming temperature until substantially all zirconium is converted to barium zirconate.

5. An electron emission coating material comprising air stabilized barium oxide particles which consist of 80% to 99% by weight barium oxide and 20% to 1% by weight barium zirconate, the barium oxide portion of each of said air stabilized particles being encased by an air protective shell of barium zirconate.

6. A fluorescent lamp electron emission coating material comprising air stabilized barium oxide particles which consist of 90% by weight barium oxide and 10% by weight barium zirconate, the barium oxide portion of each of said air stabilized particles being encased by an air protective shell of barium zirconate.

7. A fluorescent lamp comprising a sealed light-transmitting envelope carrying a coating of fluorescent material on the inner wall thereof, a quality of mercury and a filling of inert gas in said envelope, filamentary electrodes in said envelope, and an electron-emission coating on said electrodes, said coating comprising air-stabilized barium oxide particles, said air-stabilized barium oxide particles consisting of from 80% to 99% by weight barium oxide and from 20% to 1% by weight barium zirconate, the barium oxide portion of each of said air-stabilized particles encased by an air-protective shell of barium zirconate.

References Cited in the file of this patent

UNITED STATES PATENTS 2,530,394   Lowry et al. _____ Nov. 21, 1950